US009510270B2

(12) United States Patent
Han et al.

(10) Patent No.: US 9,510,270 B2
(45) Date of Patent: Nov. 29, 2016

(54) APPARATUS AND METHOD FOR MANAGING BEACON MESSAGING PERIOD OF VEHICULAR COMMUNICATION

(71) Applicants: Dong Seog Han, Daegu (KR); Jhihoon Joo, Daegu (KR)

(72) Inventors: Dong Seog Han, Daegu (KR); Jhihoon Joo, Daegu (KR)

(73) Assignee: KYUNGPOOK NATIONAL UNIVERSITY INDUSTRY—ACADEMIC COOPERATION FOUNDATION, Daegu (KR)

( * ) Notice: Subject to any disclaimer, the term of this patent is extended or adjusted under 35 U.S.C. 154(b) by 189 days.

(21) Appl. No.: 13/854,695

(22) Filed: Apr. 1, 2013

(65) Prior Publication Data

US 2014/0133347 A1    May 15, 2014

(30) Foreign Application Priority Data

Nov. 13, 2012    (KR) ........................ 10-2012-0128428

(51) Int. Cl.
| | | |
|---|---|---|
| *H04W 28/18* | (2009.01) | |
| *H04W 40/20* | (2009.01) | |
| *H04W 40/24* | (2009.01) | |
| *H04W 48/12* | (2009.01) | |

(52) U.S. Cl.
CPC .................................. *H04W 48/12* (2013.01)

(58) Field of Classification Search
USPC .................. 370/235, 310; 340/902; 701/118
See application file for complete search history.

(56) References Cited

U.S. PATENT DOCUMENTS

| | | | | |
|---|---|---|---|---|
| 6,249,232 | B1* | 6/2001 | Tamura et al. | 340/902 |
| 7,911,991 | B2* | 3/2011 | Park et al. | 370/318 |
| 8,270,347 | B2* | 9/2012 | Senouci et al. | 370/328 |
| 8,295,189 | B2* | 10/2012 | Hassan et al. | 370/252 |
| 2004/0230345 | A1* | 11/2004 | Tzamaloukas | G01C 21/26 701/1 |
| 2008/0279093 | A1* | 11/2008 | Hassan et al. | 370/216 |
| 2008/0300776 | A1* | 12/2008 | Petrisor et al. | 701/118 |
| 2011/0006913 | A1* | 1/2011 | Chen et al. | 340/902 |
| 2011/0205943 | A1* | 8/2011 | Grimm et al. | 370/310 |
| 2013/0282263 | A1* | 10/2013 | Tee | 701/118 |

OTHER PUBLICATIONS

Abulela, et al., "Poster: Traffic-Adaptive Packet Relaying in VANET", Poster: The Third ACM International Workshop on Vehicular Ad Hoc Networks (VANET 2006), Los Angeles, Calif., USA, Sep. 2006.

Jerbi, et al., "GyTAR: improved Greedy Traffic Aware Routing Protocol for Vehicular Ad Hoc Networks in City Environments", Poster: Proceedings of the 4th ACM International Workshop on Vehicular Ad Hoc Networks, Montreal, Quebec, Canada, Sep. 2007.

* cited by examiner

*Primary Examiner* — Steven H Nguyen
*Assistant Examiner* — Emmanuel Maglo
(74) *Attorney, Agent, or Firm* — Porzio, Bromberg & Newman, P.C.

(57) ABSTRACT

An apparatus and a method for managing beacon messaging period in a vehicular communication provide adaptive control on beacon messaging period by using packet delivery ratio (PDR) which is measured.

4 Claims, 2 Drawing Sheets

APPARATUS AND METHOD FOR MANAGING BEACON MESSAGING PERIOD OF VEHICULAR COMMUNICATION

CROSS-REFERENCE TO RELATED APPLICATIONS

This application claims priority from Korean Patent Application No. 10-2012-0128428, filed on Nov. 13, 2012, in the Korean Intellectual Property Office, the disclosure of which is incorporated herein by reference in its entirety.

BACKGROUND

1. Field of the Invention

The present invention relates to an apparatus and a method for managing beacon messaging period of vehicular communication, and more particularly, to an apparatus and a method for adaptively managing beacon messaging period using packet delivery ratio (PDR) as measured.

2. Description of the Related Art

Advancement in the electronics and communications technologies have enabled development of vehicles from conventional means of transportation to vehicular communication system that can provide communication services such as real-time traffic information, digital map, movies or music. The vehicular Ad-hoc network (VANET) including the vehicular communication system requires network technology that is distinguished from the conventional mobile Ad-hoc network (MANET) to suit needs of vehicles, i.e., speed and mobility.

IEEE Wireless Access in Vehicular Environment (WAVE) has been proposed as the wireless communication specification to provide the services such as VANET. This includes IEEE 802.11p and IEEE1609 standards, and supports fast linking between on-board unit (OBU) mounted on a vehicle moving with maximum 160 km/h speed and a road-side unit (RSU) installed along the road, and up to 27 Mbps high-speed data transmission. The IEEE WAVE specification has been initially developed in the North American region, but active commercialization and standardization are currently under way also in Europe, Japan, etc. The specification is also researched and developed in South Korea, as this has been opted as a candidate technology for the project led by the Korean Ministry of Land, Transport, and Maritime Affairs.

Collecting real-time traffic information is important to ensure that the intelligent traffic system stably serves traffic information. In order to do so, a system is necessary, which can collect, in real-time, related information from the vehicles on the road and transmit the traffic status analyzed based on the collected information to the respective vehicles, in real-time. However, considering that numerous vehicles are on roads, the information collected from these vehicles can increase considerable traffic in the communication between the vehicles and RSU. Various communication systems have been thus developed to transmit information to the traffic information center without loss of data.

One of these efforts relates to increasing communication capacity by adaptively adjusting beacon messaging period according to the status of the vehicles on road. For example, by utilizing the fact that the speed of the vehicle decreases as the number of vehicles on certain road area increases, it has been suggested that the beacon messaging period is managed adaptively in response to the variations in the vehicle speed, or adaptively managing beacon messaging period by utilizing the vehicular density on road.

However, the above-mentioned suggestions have shortcoming. That is, the beacon messaging period is not adaptively managed, when the vehicles run with relatively low speed on a road that does not have high vehicular density, or when vehicular density is particularly high at a certain point of road, while the road itself does not have high vehicular density overall. Accordingly, a problem occurs as the beacon messaging period is inadvertently set to be shorter and causes traffic collision of the beacon messages.

SUMMARY

Exemplary embodiments of the present inventive concept overcome the above disadvantages and other disadvantages not described above. Also, the present inventive concept is not required to overcome the disadvantages described above, and an exemplary embodiment of the present inventive concept may not overcome any of the problems described above.

The invention is suggested for the above problems, and the objective is to provide an apparatus and a method for determining overall communication environment and managing beacon messaging period adaptively to the environment in a vehicular communication.

Another objective is to provide an apparatus and a method for managing beacon messaging period of a vehicle placed on a road with relatively lower density, when a specific area of the road has high vehicular density.

In one embodiment, an apparatus for managing a beacon messaging period in a vehicular communication is provided, which may include a packet delivery ratio (PDR) measuring unit which measures a PDR, a PDR determining unit which compares the PDR with a threshold, and a messaging period managing unit which increases the beacon messaging period, when determining via the PDR determining unit that the PDR is less than the threshold.

When determining via the PDR determining unit that the PDR is equal to, or greater than the threshold, the messaging period managing unit may set the beacon messaging period as a reference messaging period.

The reference messaging period may preferably be 100 ms.

The apparatus may additionally include a road density measuring unit which measures a vehicular density of a road on which vehicles are placed, a driving lane density measuring unit which measures vehicular density of a driving lane on which the vehicles are placed, and a density comparing unit which compares the road density and the driving lane density, in which the messaging period managing unit may decrease the beacon messaging period, when determining via the density comparing unit that the driving lane density is less than the road density by a predetermined ratio.

In another embodiment, a method for managing a beacon messaging period in a vehicular communication is provided, which may include measuring a packet delivery ratio (PDR) (step A), comparing the PDR with a threshold (step B), and increasing the beacon messaging period, when determining at the step (B) that the PDR is less than the threshold (step C-1).

When determining at the step (B) that the PDR is equal to, or greater than the threshold, the method may include setting the beacon messaging period as a reference messaging period (step C-2).

The reference messaging period may preferably be 100 ms.

The method may additionally include measuring a vehicular density of a road on which vehicles are placed (step D), measuring vehicular density of a driving lane on which the vehicles are placed (step E), comparing the road density and the driving lane density with each other (step F), and decreasing the beacon messaging period, when determining at the step (F) that the driving lane density is less than the road density by a predetermined ratio (step G).

An apparatus and a method for managing beacon messaging period in a vehicular communication according to embodiments of the invention provide an effect of increased information reception rate, by determining overall communication environment based on packet delivery ratio (PDR) measurement and controlling the beacon messaging period adaptively to the environment.

Further, the invention also provides an effect of controlling beacon messaging period depending on driving lanes, by comparing the overall vehicular density of the road with the vehicular density of a specific driving lane and controlling the beacon messaging period of the vehicles placed on a driving lane with relatively lower density, when determining that the specific driving lane of the road particularly has high vehicular density.

BRIEF DESCRIPTION OF THE DRAWINGS

The foregoing and other features and advantages of the inventive concepts will be apparent from the more particular description of preferred embodiments of the inventive concepts, as illustrated in the accompanying drawings in which like reference characters refer to the same parts throughout the different views. The drawings are not necessarily to scale, emphasis instead being placed upon illustrating the principles of the inventive concepts. In the drawings.

DETAILED DESCRIPTION OF EXEMPLARY EMBODIMENTS

Figure 1:
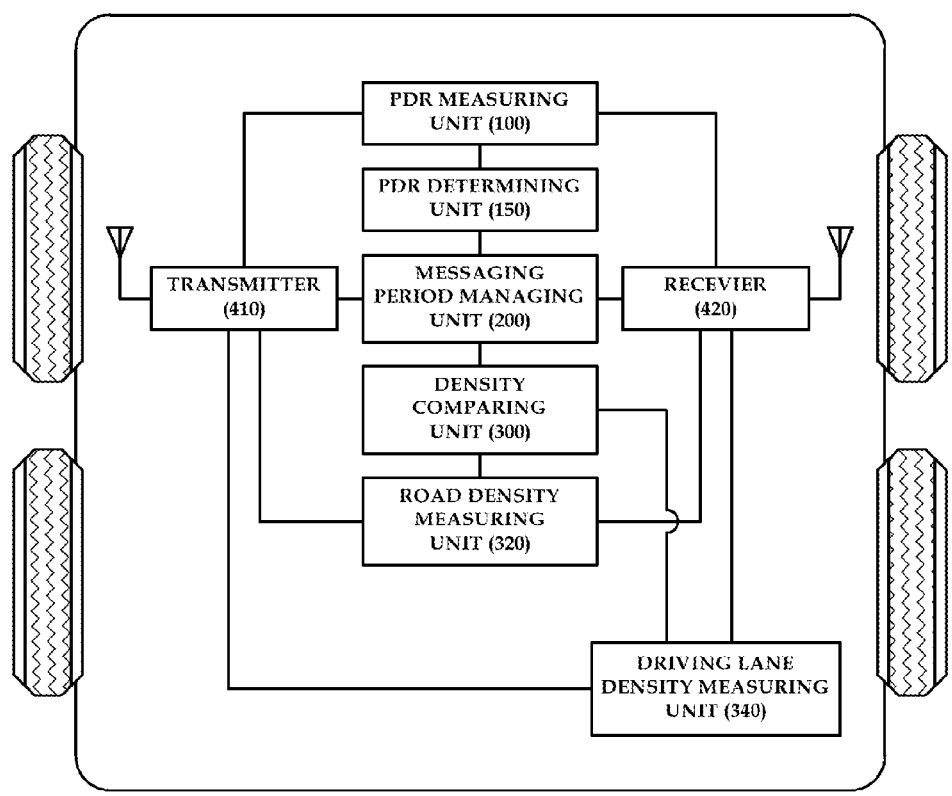
FIG. 1 illustrates an apparatus for managing beacon messaging period in a vehicular communication, according to an embodiment.

Certain exemplary embodiments of the present inventive concept will now be described in greater detail with reference to the accompanying drawings.

In the following description, same drawing reference numerals are used for the same elements even in different drawings. The matters defined in the description, such as detailed construction and elements, are provided to assist in a comprehensive understanding of the present inventive concept. Accordingly, it is apparent that the exemplary embodiments of the present inventive concept can be carried out without those specifically defined matters. Also, well-known functions or constructions are not described in detail since they would obscure the invention with unnecessary detail.

While the expressions such as "first" or "second" can be used to refer to various elements, the elements are not limited by the expressions. The expressions are used only for the purpose of distinguishing one element from the other.

The expressions are used herein only for the purpose of explaining specific embodiments and not to limit the present invention. An expression in singular form encompasses plural meaning, unless otherwise specified. Throughout the description, the expression "comprise" or "have" is used only to designate the existence of characteristic, number, step, operation, element, component or a combination thereof which are described herein, but not to preclude possibility of existence of one or more of the other characteristics, numbers, steps, operations, elements, components or combinations of these or addition.

FIG. 1 illustrates an apparatus for managing beacon messaging period in a vehicular communication, according to an embodiment.

Referring to FIG. 1, the apparatus for managing beacon messaging period in a vehicular communication according to an embodiment may include a PDR measuring unit 100 which measures packet delivery ratio (PDR); a PDR determining unit 150 which compares the PDR with a threshold; and a messaging period managing unit 200 which increases a beacon messaging period, when determining through the PDR determining unit 150 that the PDR is less than the threshold.

The PDR measuring unit 100 may be connected to a vehicular transmitter 410 and a receiver 420 and measure PDR of a message for transmission and reception. The 'PDR' as used herein refers to a number of received data packets compared to the transmitted data packets, which may be utilized as an index that can indicate current communication status. A person with common knowledge in the pertinent art will understand that the method for measuring the PDR can be implemented in various modifications within a range that does not depart from the basic characteristic of the invention.

The PDR determining unit 150 compares the PDR, measured through the PDR measuring unit 100, with a threshold. The threshold may be set in advance, or inputted by a user. Alternatively, the threshold may be varied adaptively to communication environment. In one embodiment, the threshold may be set to 90%, although not limited thereto.

The messaging period managing unit 200 increases the beacon messaging period when determining through the PDR determining unit 150 that the PDR is less than the threshold. In one embodiment, the messaging period managing unit 200 may increase the beacon messaging period, when determining through the PDR determining unit 150 that the PDR is less than 90%. In another embodiment, the threshold may be varied, in which case the messaging period managing unit 200 may increase the beacon messaging period every time the PDR is less than the variable threshold.

The messaging period managing unit 200 may increase the beacon messaging period from a reference period to a predetermined extent, and may redundantly increase already-varied period from the base period. In one embodiment, the messaging period managing unit 200 may control the beacon messaging period from minimum 100 ms to maximum 300 ms, and set the range of increase/decrease of the beacon messaging period to 100 ms. However, the invention is not limited to any specific embodiment. Accordingly, the range of controlling beacon messaging period and range of increase/decrease of the messaging period may be varied within a range without departing from the basic characteristic of the present invention.

Further, the messaging period managing unit 200 may set a beacon messaging period as a reference messaging period, when determining through the PDR determining unit 150 that the PDR is equal to, or greater than the threshold. In one embodiment, the messaging period managing unit 200 may set the beacon messaging period as the reference messaging period, when determining through the PDR determining unit 150 that the PDR is equal to, or greater than 90%.

In one preferable embodiment, the reference messaging period may be set to 100 ms. Because the period of acquiring location information at a GPS receiver mounted on vehicles or other equipment has reference 100 ms acquisition period, meaningless messages may be transmitted to the neighboring vehicles and RSU, if the beacon messaging period is set to be shorter than the location information acquisition period. However, the invention is not limited to the specific embodiment, and the reference messaging period may be adaptively varied depending on surrounding communication environments or depending on needs, such as when more frequent beacon messaging is required.

Further, in another embodiment, an apparatus for managing beacon messaging period in a vehicular communication may include a road density measuring unit 320 which measures vehicular density on a road where the vehicles are placed; a driving lane density measuring unit 340 which measures vehicular density of a lane on which the vehicles are placed; and a density comparing unit 300 which compares the road density with the driving lane density. Accordingly, the messaging period managing unit 200 may decrease the beacon messaging period when determining that the driving lane density is less than the road density by a predetermined ratio based on the comparison at the density comparing unit 300.

The road density measuring unit 320 measures vehicular density on a road the vehicles are currently placed. In one embodiment, the road density measuring unit 320 may measure the current vehicular density of the road based on the beacon messages collected from the vehicles nearby. By way of example, the road density measuring unit 320 may refer to the number of beacon messages collected from the nearby vehicles, or refer to road-related status information collected from the nearby vehicles. Additionally, the road density measuring unit 320 may measure the current vehicular density of the road based on the sensed information collected from the sensor equipment such as radar or LIDAR mounted on vehicles. A person with common knowledge in the art will understand that a method for measuring vehicular density of the road may be adequately modified without departing from the basic characteristics of the present invention.

The driving lane density measuring unit 340 measures vehicular density of the driving lane on which the vehicles are placed. The driving lane density measuring unit 340 measures the density of a specific driving lane on which the vehicles are placed, unlike the road density measuring unit 320. In one embodiment, the driving lane density measuring unit 340 may measure the vehicular density of a specific driving lane based on the beacon message information collected from the nearby vehicles. For example, the driving lane density measuring unit 340 may refer to beacon messages collected from the nearby vehicles to calculate the number of vehicles placed on a specific driving lane, or refer to status information related to the specific driving lane. Alternatively, the driving lane density measuring unit 340 may measure the current vehicular density of the driving lane based on the sensed information collected from the sensor equipment such as radar or LIDAR mounted on the vehicles. A person with common knowledge in the art will understand that a method for measuring vehicular density of the specific driving lane may be adequately modified without departing from the basic characteristics of the present invention.

The density comparing unit 300 compares the road density with the driving lane density. In one embodiment, the density comparing unit 300 may compare to determine whether a specific driving lane density is less than the road density by a predetermined ratio. By way of example, the density comparing unit 300 may simply determine if a specific driving lane density is less than the road density (i.e., if 100% less than the road density). Alternatively, the density comparing unit 300 may determine if the specific driving lane density is 80% less than the road density. The 'predetermined ratio' may be initially set, or inputted by a user. Alternatively, the 'predetermined ratio' may be adaptively varied depending on environmental information. A person with common knowledge in the art will understand that the predetermined ratio may be adequately modified without departing from the basic characteristics of the present invention.

The messaging period managing unit 200 may decrease the beacon messaging period, when determining that the driving lane density is less than the road density by a predetermined ratio. This is because, when the vehicular density of a specific driving lane is less than the vehicular density of the overall road by a predetermined ratio, on the average, the vehicles on the driving lane would have faster speed than the vehicles on the other driving lanes, in which case it is advantageous to set a shorter messaging period.

As explained above, in one embodiment, the messaging period managing unit 200 may control the beacon messaging period from minimum 100 ms to maximum 300 ms, and may set the range of increasing/decreasing the beacon messaging period to 100 ms. However, the invention is not limited to any specific embodiment. Accordingly, the range of controlling beacon messaging period and range of increase/decrease of the messaging period may be varied within a range without departing from the basic characteristic of the present invention.

Figure 2:
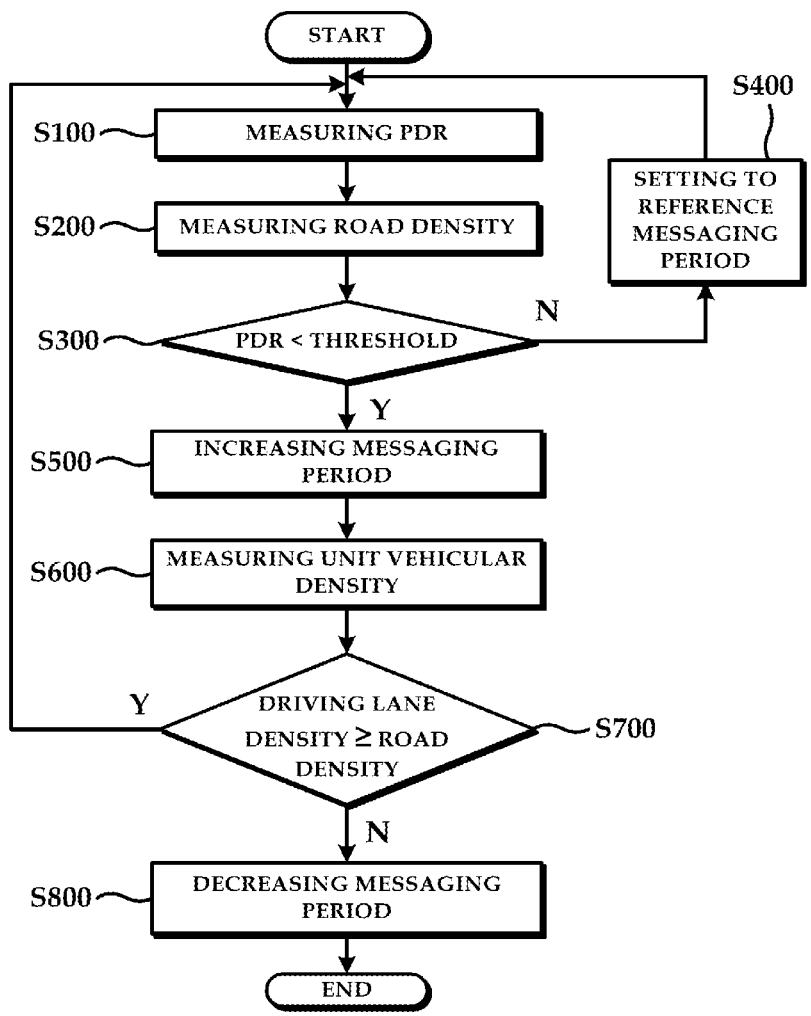
FIG. 2 is a flowchart provided to explain a method for managing beacon messaging period in a vehicular communication, according to another embodiment.

FIG. 2 is a flowchart provided to explain a method for managing beacon messaging period in a vehicular communication, according to another embodiment.

Referring to FIG. 2, a method for managing beacon messaging period in a vehicular communication, according to another embodiment may include steps of: PDR measuring step of measuring packet delivery ratio (PDR) (step A); PDR determining step of comparing the PDR with a threshold (step B); and messaging period increasing step of increasing the beacon messaging period, when determining that the PDR is less than the threshold (step C).

A method for managing beacon messaging period in a vehicular communication may additionally include steps of: road density measuring step of measuring vehicular density of a road on which vehicles are placed (step D); driving lane density measuring step of measuring vehicular density of a driving lane on which vehicles are placed (step E); density comparing step of comparing the road density with the driving lane density (step F); and messaging period decreasing step of decreasing the beacon messaging period, when determining through the step (F) that the driving lane density is less than the road density by a predetermined ratio (step G).

At S100, a packet delivery ratio (PDR) of a message transmitted and received via the transmitter and the receiver mounted in a vehicle is measured. The PDR, which is the number of received data packets with reference to the number of transmitted data packets, may be utilized as an index that can indicate the current communication status. A person skilled in the art will understand that the method for measuring PDR may be implemented in various modifications without departing from the basic concept of the invention.

At S200, the vehicular density on the road the vehicles are currently placed is measured. In one embodiment of the present invention, the current vehicular density of the road may be measured based on the beacon messages collected from the nearby vehicles. For example, the number ob beacon messages collected from the nearby vehicles, or the road-related status collected via the nearby vehicles may be referenced. Additionally, the current vehicular density of the road may be measured based on the sensed information collected from the sensor equipment such as radar or LIDAR mounted on vehicles. A person with common knowledge in the art will understand that a method for measuring vehicular density of the road may be adequately modified without departing from the basic characteristics of the present invention.

In one embodiment of the present invention, the sequence of the operation at S200 may not be limited to the embodiment illustrated in FIG. 2 only. For example, the operation at S200 may be performed together with the operation at S600.

At S300, the measured PDR of the operation at S100 is compared with a threshold. The threshold may be set in advance, or inputted by a user. Further, the threshold may be adaptively varied according to environment. In one embodiment of the present invention, the threshold may be set to 90%, but not limited thereto.

When it is determined that the PDR is above the threshold at S300, at S400, the beacon messaging period may be set as a reference messaging period. In one embodiment, the beacon messaging period may be set as the reference messaging period, when the PDR at S300 is determined to be above 90%.

In one embodiment, the reference messaging period may be set to 100 ms. Because the period of acquiring location information at a GPS receiver mounted on vehicles or other equipment has reference 100 ms acquisition period, meaningless messages may be transmitted to the neighboring vehicles and RSU, if the beacon messaging period is set to be shorter than the location information acquisition period. However, the invention is not limited to the specific embodiment, and the reference messaging period may be adaptively varied depending on surrounding communication environments or depending on needs, such as when more frequent beacon messaging is required.

At S500, when it is determined at S300 that the PDR is less than the threshold, the beacon messaging period may be increased. In one embodiment, when it is determined as a result of determination at S300 that the PDR is less than 90%, the beacon messaging period may be increased. In another embodiment, the threshold may be variable, in which case the beacon messaging period may be increased whenever the PDR is less than the varied threshold, at S500.

To be specific, at S500, the beacon messaging period may be increased from a base period to a predetermined extent, or already-varied period from the base period may be redundantly increased. In one embodiment, the operation at S500 may control the beacon messaging period from minimum 100 ms to maximum 300 ms, and set the range of increase/decrease of the beacon messaging period to 100 ms. However, the invention is not limited to any specific embodiment. Accordingly, the range of controlling beacon messaging period and range of increase/decrease of the messaging period may be varied within a range without departing from the basic characteristic of the present invention.

After that, at S600, vehicular density on a road the vehicles are currently placed is measured. Unlike the operation at S200, at S600, the density of a specific driving lane on which the vehicles are placed, is measured. In one embodiment, the operation at S600 may measure the vehicular density of a specific driving lane based on the beacon message information collected from the nearby vehicles. For example, beacon messages collected from the nearby vehicles may be referenced to calculate the number of vehicles placed on a specific driving lane, or status information related to the specific driving lane may be referenced. Alternatively, the current vehicular density of the driving lane may be measured based on the sensed information collected from the sensor equipment such as radar or LIDAR mounted on the vehicles. A person with common knowledge in the art will understand that a method for measuring vehicular density of the specific driving lane may be adequately modified without departing from the basic characteristics of the present invention.

The operations at S200 and S600 relate to measuring the vehicular density on roads or specific driving lanes the vehicles are currently placed, and the sequence of performing these operations (S200, S600) may not be limited to the specific example illustrated in FIG. 2.

At S700, the road density measured at S200 is compared with the driving lane density measured at S600. In one embodiment, the operation at S700 may determine whether a specific driving lane density is less than the road density by a predetermined ratio based on comparison. By way of example, the operation at S700 simply determine if a specific driving lane density is less than the road density (i.e., if 100% less than the road density). Alternatively, the operation at S700 may determine if the specific driving lane density is 80% less than the road density. The 'predetermined ratio' may be initially set, or inputted by a user. Alternatively, the 'predetermined ratio' may be adaptively varied depending on environmental information. A person with common knowledge in the art will understand that the predetermined ratio may be adequately modified without departing from the basic characteristics of the present invention.

At S800, the beacon messaging period may be decreased, when it is determined at S700 that the driving lane density is less than the road density by a predetermined ratio. This is because, when the vehicular density of a specific driving lane is less than the vehicular density of the overall road by a predetermined ratio, on the average, the vehicles on the driving lane would have faster speed than the vehicles on the other driving lanes, in which case it is advantageous to set a shorter messaging period.

In one embodiment, the beacon messaging period may be controlled from minimum 100 ms to maximum 300 ms at S500 and S800, and the range of increasing/decreasing the beacon messaging period may be set to 100 ms. However, the invention is not limited to any specific embodiment. Accordingly, the range of controlling beacon messaging period and range of increase/decrease of the messaging period may be varied within a range without departing from the basic characteristic of the present invention.

Although the embodiment is illustrated in FIG. 2 in which the messaging period control is completed when the operation at S800 is performed, the invention is not limited to any specific embodiment. Accordingly, in another embodiment, the beacon messaging period control method for vehicular use may be implemented in which the operation at S100 may be performed repeatedly following the operation at S800.

The preferred embodiments of the invention have been explained so far. a person skilled in the art will understand that the invention may be implemented in modifications without departing from the basic characteristics of the invention. Accordingly, the foregoing exemplary embodiments and advantages are merely exemplary and are not to be construed as limiting the present invention. The present teaching can be readily applied to other types of apparatuses. Also, the description of the exemplary embodiments of the present inventive concept is intended to be illustrative, and not to limit the scope of the claims.

What is claimed is:

1. An apparatus for adaptively managing a beacon message transmission period in a vehicular communication, the apparatus comprising:
   a packet delivery ratio (PDR) measuring unit which measures a packet delivery ratio (PDR), the packet delivery ratio (PDR) measuring unit connected to a vehicular transmitter and receiver to measure the packet delivery ratio (PDR) of a message for transmission and reception;
   a packet delivery ratio (PDR) determining unit which compares the packet delivery ratio (PDR) with a threshold;
   a driving lane density measuring unit which measures vehicular density of a driving lane on which a personal vehicle is placed;
   a road density measuring unit which measures a vehicular density of a road comprising the driving lane which the personal vehicle is placed and others which the personal vehicle is not placed based on information collected by sensor equipment;
   a density comparing unit which compares the road density and the driving lane density; and
   a messaging period managing unit which increases the transmission interval of beacon messages to increase the beacon message transmission period when determining via the packet delivery ratio (PDR) determining unit that the packet delivery ratio (PDR) is less than the threshold and the messaging period managing unit decreases the transmission interval of beacon messages to decrease the beacon message transmission period when determining via the density comparing unit that the driving lane density is less than the road density by a predetermined ratio, wherein when determining via the packet delivery ratio (PDR) determining unit that the packet delivery ratio (PDR) is equal to, or greater than the threshold, the messaging period managing unit sets the transmission interval of the beacon messages as a reference transmission interval.

2. The apparatus of claim 1, wherein the reference transmission interval is 100 ms.

3. A method for adaptively managing a beacon message transmission period in a vehicular communication, the method comprising:
   a. measuring a packet delivery ratio (PDR) by connecting to a vehicular transmitter and receiver to measure the packet delivery ratio (PDR) of a message for transmission and reception;
   b. comparing the packet delivery ratio (PDR) with a threshold; and
   c. measuring vehicular density of a driving lane on which a personal vehicle is placed;
   d. measuring a vehicular density of a road comprising the driving lane which the personal vehicle is placed and others which the personal vehicle is not placed based on information collected by sensor equipment;
   e. comparing the road density and the driving lane density with each other;
   f. increasing the transmission interval of beacon messages to increase the beacon message transmission period when determining that the packet delivery ratio (PDR) is less than the threshold at the step b; and
   g. decreasing the transmission interval of beacon messages to decrease the beacon message transmission period when determining that the driving lane density is less than the road density by a predetermined ratio at the step e,
   wherein when determining at the step (b) that the packet delivery ratio (PDR) is equal to, or greater than the threshold, comprising setting the transmission interval of beacon messages as a reference transmission interval.

4. The method of claim 3, wherein the reference transmission interval is 100 ms.

* * * * *